United States Patent [19]

Ochiai et al.

[11] 4,281,898
[45] Aug. 4, 1981

[54] AUTOMATIC ANTIGLARE REARVIEW MIRROR

[75] Inventors: Akio Ochiai, Shizuoka; Noriyuki Iida, Fujieda; Yasumasa Yoshimura, Shizuoka, all of Japan

[73] Assignee: Murakami Kaimeido Co., Ltd., Japan

[21] Appl. No.: 10,128

[22] Filed: Feb. 7, 1979

[51] Int. Cl.³ .............................................. G02B 17/00
[52] U.S. Cl. ................................. 350/281; 350/278; 350/289; 350/302
[58] Field of Search ............... 350/281, 279, 302, 204, 350/279, 211, 292, 286, 281, 278, 289; 75/0.5 AA; 279/1; 335/285; 51/430, 101 LG; 1/362

[56] References Cited

U.S. PATENT DOCUMENTS

| 3,026,771 | 3/1962 | Knowlton et al. | 350/281 |
| 3,666,354 | 5/1972 | Russell | 350/281 |
| 3,680,951 | 8/1972 | Jordon et al. | 350/281 |
| 4,078,859 | 3/1978 | Sharett | 350/281 |

*Primary Examiner*—John K. Corbin
*Assistant Examiner*—B. W. de los Reyes
*Attorney, Agent, or Firm*—Robert E. Burns; Emmanuel J. Lobato; Bruce L. Adams

[57] ABSTRACT

A mirror assembly capable of providing an image of high or low brightness is pivotally supported by a housing or other stationary support, for movement between two operating positions to provide the high and low brightness images. For automatic actuation of the mirror assembly, a light sensitive element is provided which on sensing a change in the intensity of incident light, energizes an electromagnet or electromagnets affixed to either of the mirror assembly and the stationary support. The energized electromagnet or electromagnets attract and/or repel a permanent magnet or magnets affixed to the other of the mirror assembly and the stationary support. Normally, the core of the electromagnet or of one of the electromagnets is held attracted by the permanent magnet or by one of the permanent magnets to retain the mirror assembly in a selected one of the operating positions.

11 Claims, 25 Drawing Figures

AUTOMATIC ANTIGLARE REARVIEW MIRROR

BACKGROUND OF THE INVENTION

1. Field of the Invention

This invention pertains to mirrors, and more specifically to a rearview mirror to be mounted in any convenient location interiorly or exteriorly of an automotive vehicle. Still more specifically, the invention is directed to an antiglare rearview mirror mechanism for protecting the driver's eyes from glare, particularly headlight glare from following vehicles, by automatically providing a reflected image of high or low brightness depending upon the intensity of light impinging thereon.

2. Description of the Prior Art

The proper perception of traffic activity to the rear of the vehicle through the rearview mirrors is one of the essentials of driving safety. During night driving, however, the driver's visibility is seriously affected by the glare from following vehicle headlights reflected by the rearview mirrors into his eyes. The glare can reduce or disable the driver's vision not only of the rear traffic events but further of the roadway ahead.

In an attempt to minimize such glare, U.S. Pat. No. 3,740,122 to Stern discloses a rearview mirror assembly including a mirror element which is manually moved between two positions to produce reflected images of different intensity. The mirror element is retained in either position by permanent magnets attached thereto and to its housing. This prior art device is subject to the objection that it requires manual actuation, imposing an additional duty on the driver and possibly detracting his attention from driving.

The above drawback is totally absent from the automatic antiglare mirror disclosed in U.S. Pat. No. 4,078,859 to Sharett. According to this Sharett patent, a mirror element pivoted within a housing is normally spring retained in one of its operating positions. Automatic actuation of the mirror element is effected by a photocell which on sensing an increase in the intensity of light falling thereon, energizes electromagnets attached to the mirror element and to the housing. Thus energized, the electromagnets function to move the mirror element to the other operating position against the force of the spring, resulting in the attenuation of the reflected light.

This prior art automatic antiglare mirror has its own disadvantages, however. First, the spring in use must be of sufficiently heavy make to positively retain the mirror element in its normal operating position in spite of vibrations produced by the vehicle running. Thus, in the event of glare, the electromagnets must be fed with electrical energy sufficiently great to pivot the mirror element against the force of the spring.

The energy requirement of the antiglare mirror according to the Sharett patent is further augmented by the face that the electromagnets must be held energized as long as the intensity of the incident light remains high. The electrical energy fed to the electromagnets during the prolonged presence of the glare source must also be sufficiently great to overcome the force of the spring tending to return the mirror element to its normal position. In the worst case, therefore, the coils of the electromagnets may overheat or break down.

As an additional disadvantage the Sharett antiglare mirror is not adaptable for manual actuation of its mirror element. Such manual actuation, in addition to automatic actuation, adds to the utility of antiglare rearview mirrors for automative use.

SUMMARY OF THE INVENTION

It is an object of this invention to provide an improved automatic antiglare mirror mechanism which makes a minimum of electrical power requirement.

Another object of the invention is to provide permanent magnet and electromagnet assemblies, for use in the antiglare mirror mechanism, that make most wasteless use of magnetic flux produced, thereby contributing to the operating reliability and manufacturing economy of the mechanism.

A further object of the invention is to provide an antiglare mirror mechanism which permits manual, in addition to automatic, actuation.

A further object of the invention is to provide an antiglare mirror mechanism of the above character well suited for automotive use, as an inside or outside rearview mirror to be mounted in any convenient location on the vehicle.

Stated in its perhaps broadest aspect, the invention provides a mirror mechanism for selectively providing an image of high or low brightness depending upon the intensity of incident light, which includes a mirror assembly pivotally supported by support means for movement between two predetermined operating positions to provide the high and low brightness images. Either of the mirror assembly and the support means has permanent magnet means secured thereto, and the other has electromagnet means secured thereto, with the permanent magnet and electromagnet means disposed in opposed relationship to each other. Also included is a light sensitive element arranged to sense the intensity of the light falling on the mirror assembly and adapted to energize, on sensing a change in the intensity of the incident light, the electromagnet means only for a preset period of time for causing the pivotal motion of the mirror assembly from one operating position to the other by virtue of magnetic attraction and/or repulsion exerted between the permanent magnet and electromagnet means.

It will thus be seen that the energization of the electromagnet means is required only for moving the mirror assembly between the two operating positions. Normally the permanent magnet means acts on the core means of the electromagnet means to hold the mirror assembly in a selected one of the operating positions. It is also to be appreciated that it is unnecessary to overcome the force of a spring, as in the aforesaid Sharett U.S. patent, in moving the mirror assembly in either direction. Still further, the attractive force of the permanent magnet means can be effectively utilized for the movement of the mirror assembly. All these factors contribute to the reduction of the electrical power requirement of the electromagnet means to an absolute minimum.

In some embodiments the permanent magnet means comprises a pair of permanent magnet assemblies, and the electromagnet means comprises a pair of electromagnet assemblies, with each permanent magnet assembly disposed opposite to and coacting with one of the electromagnet assemblies for moving the mirror assembly between the two operating positions and for holding the mirror assembly in either operating position. Each permanent magnet assembly comprises a permanent magnet proper and a yoke substantially integrally connected thereto. Each electromagnet assembly likewise comprises an electromagnet proper and a yoke substantially integrally connected to the core of the electromagnet. These yokes are adapted to minimize leakage flux.

The use of such permanent magnet and electromagnet assemblies results in a substantial increase in the attractive and repulsive forces exerted therebetween. The mirror assembly can therefore be positively moved between the operating positions, and positively retained in either position, even by use of permanent magnets proper of comparatively low flux density and electromagnets proper of comparatively small output.

According to a further feature of this invention, a pair of counteracting springs extend between the mirror assembly and the support means. The spring pair is well calculated to permit the mirror assembly to be moved from one operating position to the other through exertion of minimal attractive and/or repulsive forces between the permanent magnet and electromagnet means. This is an additional factor contributing to the minimization of the power requirement of the electromagnet means.

It is to be understood that the meanings of the terms "mirror assembly" and "support means" as used herein and in the claims appended hereto are subject to change from embodiment to embodiment. For example, in some embodiments, the term "mirror assembly" simply means a mirror element, which is arranged to pivot within its housing. In other embodiments, the term "mirror assembly" comprehends both mirror element and housing, the former being fixedly supported by the latter, and this "mirror assembly" is pivotable relative to stationary supporting or mounting means.

The above and other objects, features and advantages of this invention and the manner of attaining them will become more readily apparent, and the invention itself will best be understood, from the following description and appended claims taken in connection with the accompanying drawings showing several preferred embodiments of the invention.

DESCRIPTION OF THE PREFERRED EMBODIMENTS

Figure 1:
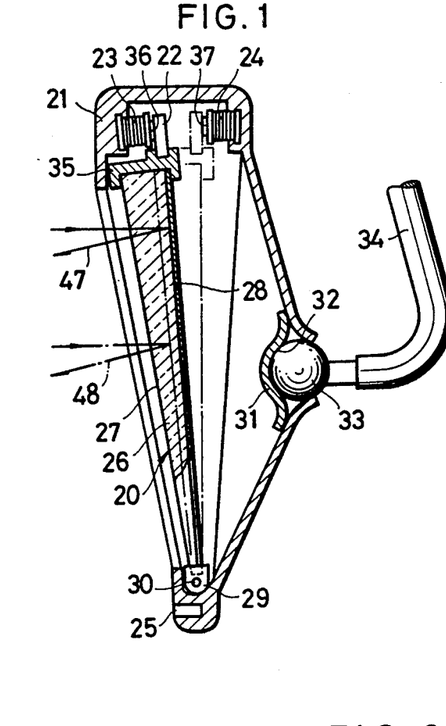
FIG. 1 is a vertical sectional view, partly in elevation, of a preferred form of the antiglare mirror mechanism in accordance with this invention, showing the mirror element in its normal or solid line position, the mirror element being pivoted to the phantom position upon increase in the intensity of incident light.

In FIG. 1 the antiglare mirror mechanism of this invention is shown adapted for use as an inside rearview mirror for an automotive vehicle. Broadly, the illustrated rearview mirror comprises a mirror element 20 arranged to pivot within a housing 21, a permanent magnet 22 carried by the mirror element, a pair of electromagnets 23 and 24 affixed to the mirror housing and disposed on the front and rear sides of the permanent magnet, and a light sensitive element or photocell 25 for selectively energizing the electromagnets in accordance with the intensity of light rays falling thereon or on the mirror element.

The mirror element 20 includes a prism 26 of glass or like material having a plain front surface 27 to produce a reflected image of low brightness and a rear surface having a reflective coating 28 to produce a reflected image of high brightness. At its bottom end the mirror element 20 is provided with a bottom frame member 29 complete with a pair of trunnions 30 (one seen) projecting from its opposite side ends. These trunnions 30 are suitably engaged in the opposite side walls of the mirror housing 21, so that the mirror element 20 is pivotable thereon between a first operating position indicated by the solid lines and a second operating position indicated by the dot-and-dash lines.

The mirror housing 21 has its rear wall shaped to define, in combination with a member 31 secured thereto, a socket 32 relatively closely but slidably receiving a ball 33 formed at one end of a mounting bracket 34. The rearview mirror is thus mounted via the ball-and-socket universal joint designed to permit manual adjustment of its angular position with respect to the driver's eyes.

The permanent magnet 22 is fixedly mounted approximately centrally on the top end of the mirror element 20 via a top frame member 35 secured to the latter. The pair of electromagnets 23 and 24 are shown to be partly embedded in the mirror housing 21 and are disposed on the front and rear sides of the permanent magnet 22 for moving the mirror element 20 between the first and second operating positions in coaction therewith. The electromagnets 23 and 24 include cores 36 and 37, respectively, with which the permanent magnet 22 is movable into and out of direct contact. When the electromagnets 23 and 24 are both not energized, the permanent magnet 22 acts upon either of the electromagnet cores 36 and 37 to retain the mirror element 20 in a selected one of the first and second operating positions.

Shown to be embedded in the mirror housing 21, in a position immediately under the mirror element 20, the photocell 25 is effective to produce an electrical output as a function of the intensity of the light impinging thereon. The photocell 25 is electrically connected to the electromagnets 23 and 24, as will be detailed presently with reference to FIG. 2.

It is to be understood that the illustrated location of the photocell 25 is purely by way of example, not only in this particular embodiment of the invention but in all the embodiments presented subsequently. Various other locations and manners of mounting are possible for the photocell 25. For example, it may be fixedly supported by some stationary part of the mirror mechanism so as to extend with substantial clearance through an opening formed in the mirror element or in its equivalent part, as taught by the mentioned Sharett U.S. Pat. No. 4,078,859.

Figure 2:
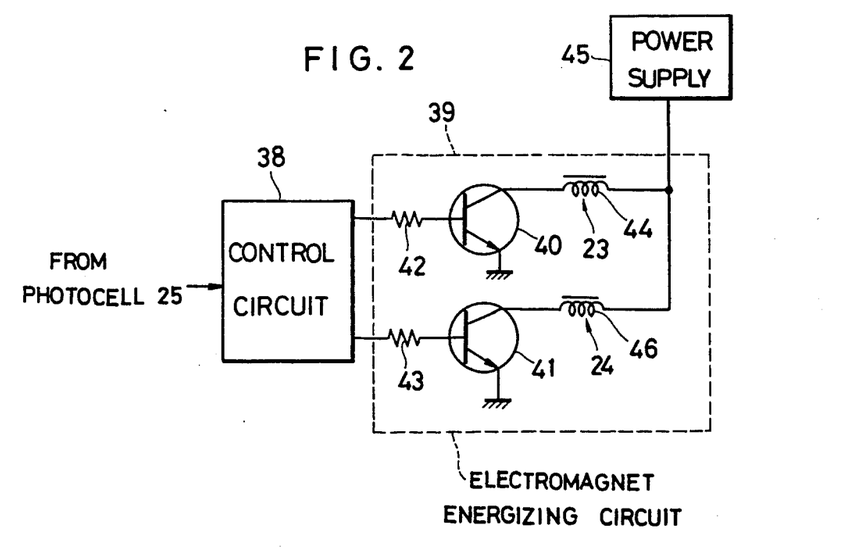
FIG. 2 is a schematic diagram, partly in block form, of an example of circuit arrangement for automatic actuation of the mirror element in the mechanism of FIG. 1.

As schematically represented in FIG. 2, the photocell 25 is electrically connected to a control circuit 38 for delivering thereto an electrical output signal representative of the intensity of the incident light. The two outputs of the control circuit 38 are connected to an energizing circuit 39 for selective energization of the electromagnets 23 and 24.

The electromagnet energizing circuit 39 comprises two NPN-type transistors 40 and 41 having their bases connected to the outputs of the control circuit 38 via resistors 42 and 43, respectively. The emitters of these transistors 40 and 41 are both grounded. The collector of the transistor 40 is connected to one of the extremities of the coil 44 of the front electromagnet 23, the other extremity of which is connected to a power supply 45. Likewise, the collector of the other transistor 41 is connected to one of the extremities of the coil 46 of the rear electromagnet 24, the other extremity of which is also connected to the power supply 45.

Figure 2A:
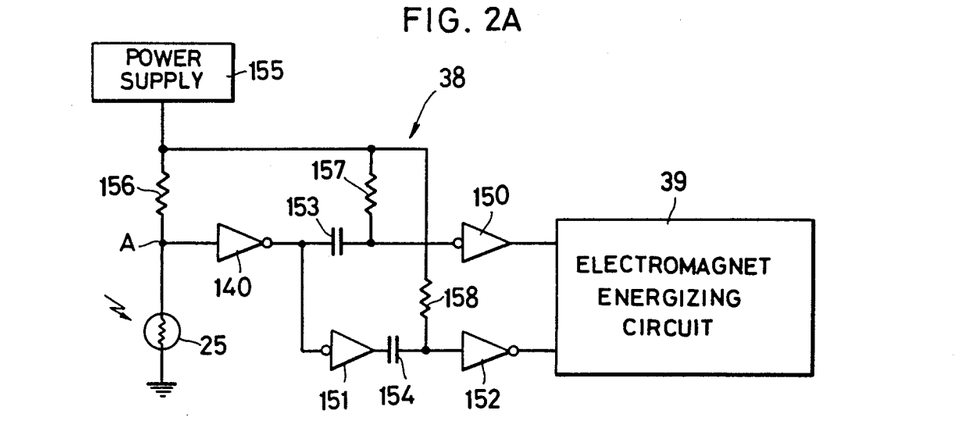
FIG. 2A is a circuit diagram of a control circuit shown in FIG. 2.

As illustrated in FIG. 2A, the control circuit 38 comprises a pair of first and second inverters 140,150 connected in series with the resistor 42 (FIG. 2) in the electromagnet energizing circuit 39, and another pair of third and fourth inverters 151,152 connected in series with the resistor 43 (FIG. 2) in the electromagnet energizing circuit 39. The inverter 140 is connecter via a capacitor 153 in series with the inverter 150, and the inverter 151 is connected via a capacitor 154 in series with the inverter 152. The inverter 151 is connected to a junction between the inverter 140 and the capacitor 153. A power supply 155 is coupled via a resistor 156 to the photocell 25, via a resistor 157 to a junction between the capacitor 153 and the inverter 150, and via a resistor 158 to a junction between the capacitor 154 and the inverter 152. The inverter 140 is connected to a junction between the resistor 156 and the photocell 25.

When the intensity of light incident on the photocell 25 increases until the potential at the point A drops past the threshold voltage level of the inverter 140, the output of the inverter 140 goes high and the capacitor 153 is not charged. The input of the inverter 150 remains in the high state, with its output in the low state. Thus, the transistor 40 (FIG. 2) remains de-energized and the electromagnet 23 also remains de-energized. At the same time, the output of the inverter 151 goes low, whereupon the capacitor 154 starts being charged, causing the input of the inverter 152 to become low and the output thereof to become high. Accordingly, the transistor 41 (FIG. 2) is turned on to energize the electromagnet 24. After the capacitor 154 has been charged up, the input of the inverter 152 becomes high again, causing its output to go low, whereupon the transistor 41 is turned off and the electromagnet 24 is de-energized. The electromagnet 24, therefore, is energized momentarily.

When the intensity of the incident light decreases past the threshold level, the output of the inverter 140 goes low, whereupon the input of the inverter 150 goes low and its output high momentarily, thereby causing the electromagnet 23 to become energized momentarily. However, since the input of the inverter 152 remains high and its output low, the electromagnet 24 remains de-energized. With the arrangement shown in FIG. 2A, the electromagnet energizing circuit 39 is given only a pulse of a short period of time from either of the two outputs of the control circuit 38 when the intensity of the incident light goes up or down past a predetermined threshold level.

It will thus be seen that the front electromagnet 23 is energized by the power supply 45 only when an output pulse of short duraction is being impressed to the base of the transistor 40 from the control circuit 38. The rear electromagnet 24 is also energized by the power supply 45 when an output pulse is being impressed to the base of the other transistor 41 from the control circuit 38.

In the use of the inside rearview mirror of FIG. 1 the mirror element 20 is normally (i.e., when the intensity of the incident light is less than the threshold level) maintained in the first or solid line position, with the permanent magnet 22 exerting an attractive force on and held in direct contact with the core 36 of the front electromagnet 23. The position of the rearview mirror should be manually adjusted so that with the mirror element 20 in the first operating position, the driver of the vehicle to which the mirror is attached may see an image of high brightness reflected by the reflective coating 28 on the rear surface of the mirror element as indicated by the solid line arrow 47.

When the intensity of the incident light increases to or past the threshold level, as upon falling of the headlight beams of a following vehicle on the rearview mirror, the photocell 25 causes the control circuit 38 to impress an output pulse to, for example, the base of the transistor 41 in the energizing circuit 39. During the consequent conduction of this transistor 41 the coil 46 of the rear electromagnet 24 is energized in such a direction that its core 37 is magnetized to attract the permanent magnet 22. The attractive force thus exerted by the rear electromagnet 24 on the permanent magnet 22 is greater than that of the permanent magnet on the core 36 of the unenergized front electromagnet 23, to such an extent that the permanent magnet is instantly moved out of contact with the front electromagnet core and into direct contact with the rear electromagnet core 37. The mirror element 20 is thus pivoted on the pair of trunnions 30 from the first to the second or phantom position.

Each output pulse from the control circuit 38 is of such short duration that the rear electromagnet 24 becomes de-energized almost immediately upon completion of the pivotal motion of the mirror element 20 from the first to the second operating position. Thereafter the permanent magnet 22 acts on the core 37 of the rear electromagnet 24 to retain the mirror element 20 in the second operating position.

With the mirror element 20 thus shifted to and retained in the second operating position, the incident light is reflected by its plain front surface 27, so that the driver sees an image of low brightness as indicated by the phantom arrow 48. This statement, of course, presupposes the fact that the position of the driver's eyes remains unchanged before and after the shifting of the mirror element 20 from the first to the second operating position. Thus, provided that the driver keeps his eyes in the constant position, the rearview mirror automatically operates to alleviate the glare which might otherwise be disabling to vision and discomforting to the driver.

The photocell 25 also causes the control circuit 38 to impress an output pulse to the base of the transistor 40 when the glare disappears, or when the intensity of the incident light drops to or past the threshold level. The consequent conduction of this transistor 40 invites the energization of the front electromagnet 23, in such a direction that its core 36 is magnetized to attract the permanent magnet 22 away from the rear electromagnet 24. Thus returned to the first operating position, the mirror element 20 can be retained in that position even after the front electromagnet 23 becomes deenergized, because the permanent magnet 22 exerts its own attractive force on the front electromagnet core 36 and is held in contact therewith.

The above described operation represents, however, only one of the three possible operating modes of the rearview mirror of FIG. 1. According to another operating mode a rise in the intensity of the incident light to or past the threshold level results in the energization of the front electromagnet 23, in such a direction that the permanent magnet 22 is repelled out of contact with its core 36 and into contact with the rear electromagnet core 37. Likewise, when the intensity of the incident light drops to or past the threshold level, the rear electromagnet 24 is energized to repel the permanent magnet 22 out of contact with its core 37 and into contact with the front electromagnet core 36. This second operating mode can be realized by use of circuitry of essentially the same configuration as depicted in FIG. 2.

According to the third mode of operation both front 23 and rear 24 electromagnets are simultaneously energized for moving the mirror element 20 from the first to the second operating position or vice versa. When the mirror element 20 is to be shifted from the first to the second position, for example, the front electromagnet 23 is energized to repel the permanent magnet 22 out of contact with its core 36, whereas the rear electromagnet 24 is energized to attract the permanent magnet into contact with its core 37. The circuitry for carrying out this third operating mode will be explained later with reference to FIG. 4.

Although the mirror element 20 is shown to be pivoted at its bottom end in FIG. 1, it will be evident that the mirror element can be pivoted at its top end. In this case the permanent magnet 22 may be mounted on the free bottom end of the mirror element, with the electromagnets 23 and 24 secured to the mirror housing on opposite sides of the permanent magnet. The mirror element 20 can itself be modified so as to taper upwardly as seen cross-sectionally as in FIG. 1.

Figure 3:
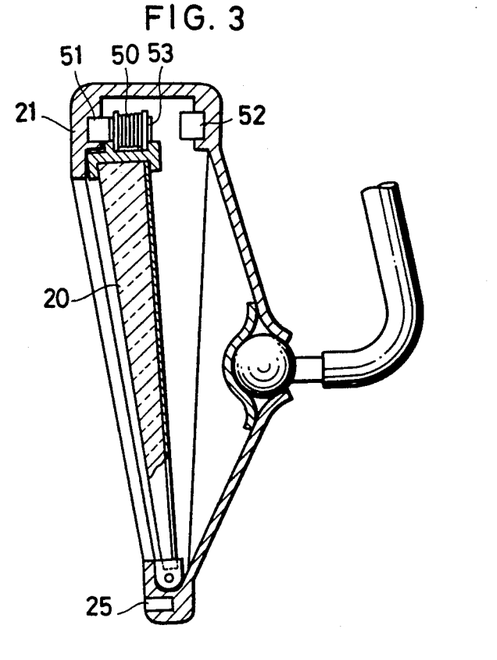
FIG. 3 is a view corresponding to FIG. 1 but showing a slight modification of the mirror mechanism.

FIG. 3 shows a slight modification of the preceding embodiment, differing therefrom only in that an electromagnet 50 is fixedly mounted on the free top end of the mirror element 20, and that a pair of permanent magnets 51 and 52 are affixed to the mirror housing 21 on the front and rear sides of the electromagnet. The electromagnet 50 includes a core 53 for movement into and out of direct contact with the front 51 and rear 52 permanent magnets. The mirror element 20 of this modified rearview mirror is to be moved between the first and second operating positions by energizing the electromagnet 50 in alternately reversed directions, as will be more fully understood from the following description.

Figures 4, 5, 6, 7:
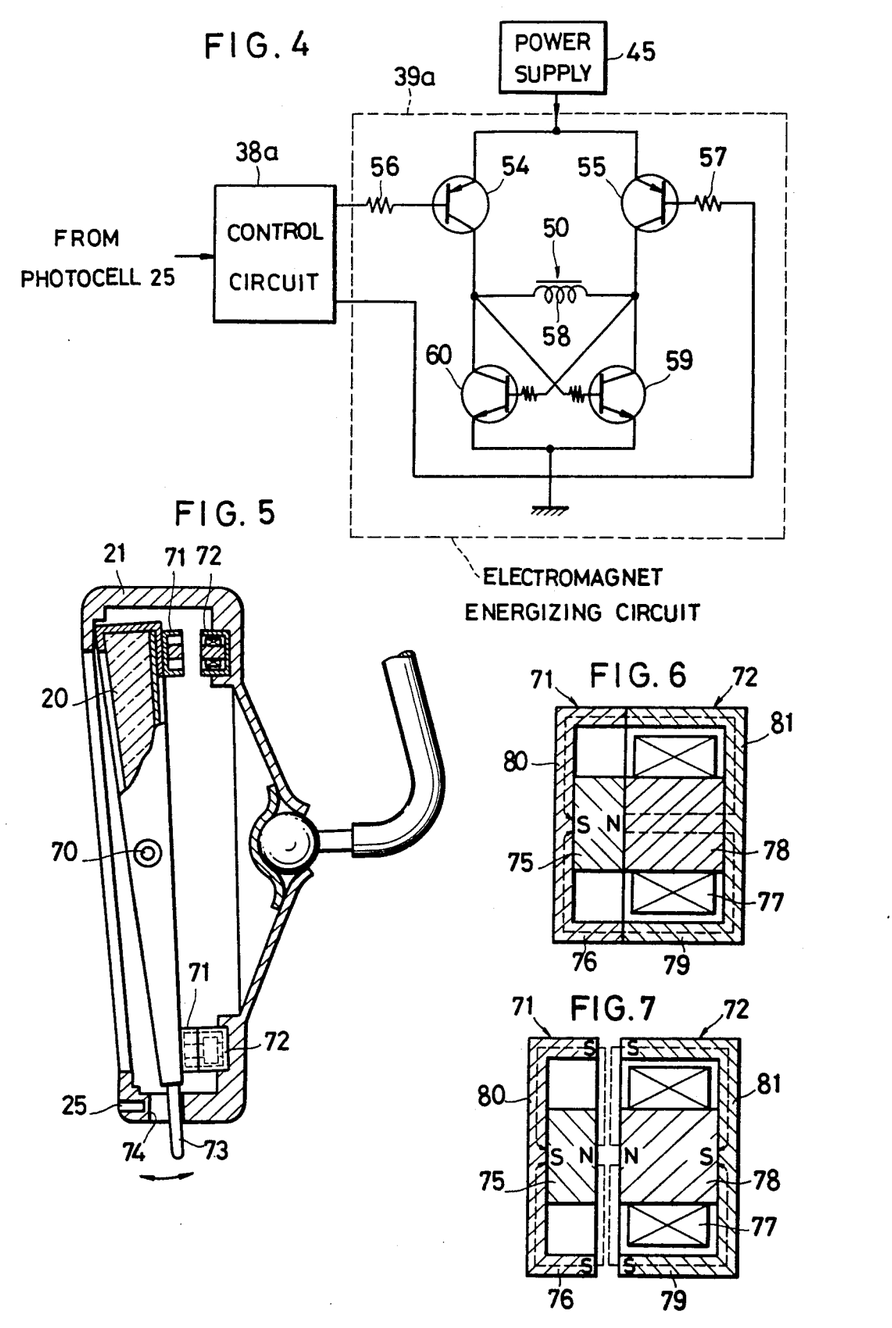
FIG. 4 is a schematic diagram, partly in block form, of an example of circuit arrangement for automatic actuation of the mirror element in the mechanism of FIG. 3.
FIG. 5 is a view corresponding to FIG. 1 but showing another preferred form of the antiglare mirror mechanism in accordance with the invention.
FIG. 6 is an enlarged sectional view of one of the pair of permanent magnet assemblies and one of the pair of electromagnet assemblies used in the mirror mechanism of FIG. 5, the view being further explanatory of the path of magnetic flux when the permanent magnet and electromagnet assemblies are in contact with each other.
FIG. 7 is a view similar to FIG. 6 and explanatory of the paths of magnetic flux when the permanent magnet and electromagnet assemblies are out of contact, with the electromagnet assembly energized so as to repel the permanent magnet assembly.

FIG. 4 is a schematic representation of an example of circuitry suitable for use with the rearview mirror of FIG. 3. The photocell 25 of the rearview mirror is electrically connected to a control circuit 38a which is substantially, not exactly, identical in configuration with the control circuit 38 of FIG. 2. The two outputs of the control circuit 38a are connected to an electromagnet energizing circuit 39a.

Figure 4A:
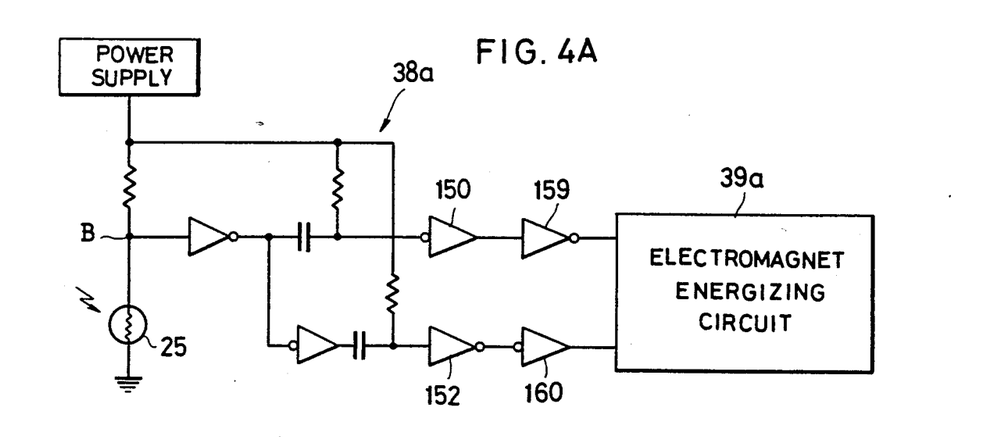
FIG. 4A is a circuit diagram of a control circuit shown in FIG. 4.

The control circuit 38a shown in FIG. 4A has, in addition to all of the components of the circuit 38 of FIG. 2A, a pair of additional inverters 159,160, the inverter 159 being connected in series between the second inverter 150 and the resistor 56 (FIG. 4) in the electromagnet energizing circuit 39a, and the inverter 160 being in series between the fourth inverter 152 and the resistor 57 (FIG. 4). The control circuit 38a produces a negative pulse at the output of the inverter 160 each time the intensity of the incident light increases past the threshold level, and produces a negative pulse at the output of the inverter 159 each time the intensity of the incident light decreases past the threshold level.

The energizing circuit 39a includes two PNP-type transistors 54 and 55 having their bases connected to the outputs of the control circuit 38a via resistors 56 and 57, respectively. The emitters of these transistors 54 and 55 are both connected to the power supply 45. The collectors of the transistors 54 and 55 are connected to the opposite extremities of the coil 58 of the electromagnet 50.

Also included in the energizing circuit 39a are two NPN-type transistors 59 and 60 having their bases connected to the collectors of the transistors 54 and 55, respectively. The emitters of the transistors 59 and 60 are both grounded. The collector of the transistor 59 is connected to that extremity of the electromagnet coil 58 which is connected to the collector of the transistor 55. The collector of the transistor 60 is connected to the other extremity of the electromagnet coil 58.

In the operation of the rearview mirror of FIG. 3 the photocell 25 causes the control circuit 38a to impress a negative output pulse to, for example, the base of the transistor 55 when the intensity of the incident light increases to or past the threshold level. During the conduction of this transistor 55 and, therefore, of the transistor 60, the electromagnet coil 58 is energized in one direction to cause the mirror element 20 to move from the first to the second operating position. The electromagnet core 53 remains attracted by the rear permanent magnet 52 after the electromagnet coil 58 becomes deenergized, so that the mirror element 20 can be retained in the second operating position as in the preceding embodiment.

The control circuit 38a impresses a negative output pulse to the base of the transistor 54 upon cessation of the glare. The transistors 54 and 59 are then both rendered conductive to cause the electromagnet coil 58 to be energized in the opposite direction, so that the mirror element 20 is moved from the second back to the first operating position. The electromagnet core 53 remains attracted by the front permanent magnet 51 after the electromagnet coil 58 becomes deenergized.

It has been mentioned in connection with the FIG. 1 embodiment that according to its third mode of operation, the front and rear electromagnets are simultaneously energized for exerting both repulsive and attractive forces on the permanent magnet in moving the mirror element in either direction between the first and second operating positions. This third operating mode of the FIG. 1 embodiment can be realized by use of two electromagnet energizing circuits each configured like the energizing circuit 39a of FIG. 4.

FIG. 5 shows another preferred embodiment in which the mirror element 20 is pivotally supported within the housing 21 by a pair of trunnions 70 (one seen) positioned intermediate between its top and bottom ends. For automatically moving the mirror element 20 between the first and second operating positions, a pair of permanent magnet assemblies 71 are affixed to the back of the mirror element at or adjacent the top and bottom ends thereof. A corresponding pair of electromagnet assemblies 72 as shown to be partly embedded in the mirror housing 21, in positions opposite to the respective permanent magnet assemblies 71. If desired, however, the permanent magnet assemblies 71 may be secured to the mirror housing 21, and the electromagnet assemblies 72 to the mirror element 21. These permanent magnet assemblies 71 and electromagnet assemblies 72 will be detailed later with reference to FIGS. 6, 7, 8A and 8B.

The mirror element 20 of this FIG. 5 embodiment is further shown to be equipped with an operating tab 73 extending downwardly therefrom through a slot 74 in the bottom of the mirror housing 21. The operating tab 73 is intended to be manipulated as indicated by the double headed arrow for moving the mirror element 20 between the first and second operating positions. It will be readily seen that the FIGS. 1 and 3 embodiments can also be modified to include such an operating tab for manual, in addition to automatic, actuation of the mirror element.

In FIG. 6 one of the permanent magnet assemblies 71 is shown in contact with the corresponding one of the electromagnet assemblies 72, and in FIG. 7 is shown the permanent magnet assembly out of contact with the electromagnet assembly. Each permanent magnet assembly 71 comprises a permanent magnet proper 75 and a yoke or casing 76 connected directly to the permanent magnet proper. Each electromagnet assembly 72 likewise comprises an electromagnet proper, including a coil 77 and core 78 surrounded thereby, and a yoke or casing 79 connected directly to the electromagnet core. The yokes 76 and 79 are both made from material of high magnetic permeability.

Figure 8A:
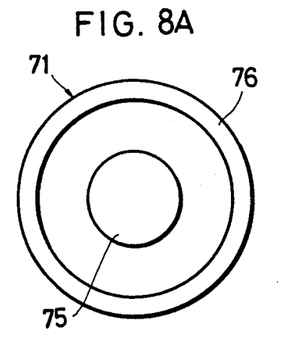
FIG. 8A is an end elevational view of the permanent magnet assembly of FIGS. 6 and 7.

As will be seen from its end view given in FIG. 8A, each permanent magnet assembly 71 is of generally cylindrical shape, its yoke 76 being in the shape of a hollow cylinder closed at one end 80. The permanent magnet proper 75 is also cylindrical in shape and is secured to the center of the closed end 80 of the yoke 76.

Figure 8B:
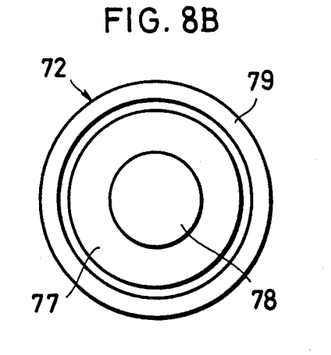
FIG. 8B is an end elevational view of the electromagnet assembly of FIGS. 6 and 7.

The end view of each electromagnet assembly 72 given in FIG. 8B also reveals that its yoke 79 is in the shape of a hollow cylinder closed at one end 81 disposed away from the permanent magnet assembly. Also cylindrical in shape, the electromagnet core 78 is secured to the center of the closed end 81 of the yoke 79. The electromagnet assembly yoke 79 is of the same diameter as the permanent magnet assembly yoke 76, and the electromagnet core 78 is of the same diameter as the permanent magnet proper 75.

Thus, when the permanent magnet proper 75 of each permanent magnet assembly 71 is in contact with the electromagnet core 78 of the corresponding electromagnet assembly 72, as shown in FIG. 6, the open ends of the yokes 76 and 79 are also in close contact with each other. Let it now be assumed that the permanent magnet proper 75 has the north-seeking (N) pole at its end held in contact with the electromagnet core 78. Then, as indicated by the arrow headed dashed lines in FIG. 6, the magnetic lines of force from this N pole of the permanent magnet proper 75 pass through the electromagnet core 78, electromagnet assembly yoke 79 and permanent magnet assembly yoke 76, back into the permanent magnet proper through its south-seeking (S) pole which is in direct contact with the yoke 76.

A closed magnetic circuit is completed as above by each permanent magnet assembly 71 and the corresponding electromagnet assembly 72 when they are in contact with each other. This closed magnetic circuit is effective to reduce leakage flux to a minimum. The magnetic attraction exerted between the permanent magnet 71 and electromagnet 72 assemblies is therefore remarkably higher than in the case where the yokes 76 and 79 are not employed.

FIG. 7 shows the permanent magnet 71 and electromagnet 72 assemblies out of contact with each other, with the electromagnet coil 77 energized in such a direction that its core 78 repels the permanent magnet proper 75. In this case, not only the opposed ends of the permanent magnet proper 75 and electromagnet core 78 but also those of the yokes 76 and 79 have like magnetic poles, and a substantially closed magnetic loop is formed by each of the permanent magnet and electromagnet assemblies. The repulsive forces exerted between the two assemblies are therefore also materially higher than in the case where the yokes 76 and 77 are not employed.

With reference back to FIG. 5, it will be readily seen that the rearview mirror illustrated therein, including the pair of permanent magnet assemblies 71 and pair of electromagnet assemblies 72 of the above constructions, can be operated by either of the three different modes set forth in connection with the FIG. 1 embodiment. The other details of construction and operation of this FIG. 5 embodiment are considered self-evident from the foregoing description.

Figure 9A:
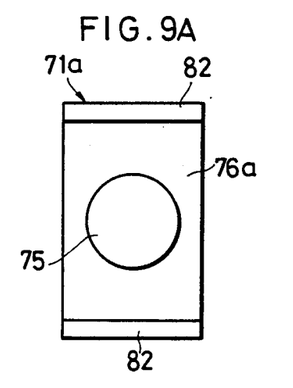
FIG. 9A is an end elevational view of a modified permanent magnet assembly for use in the mirror mechanism of the type shown in FIG. 5.
Figure 9B:
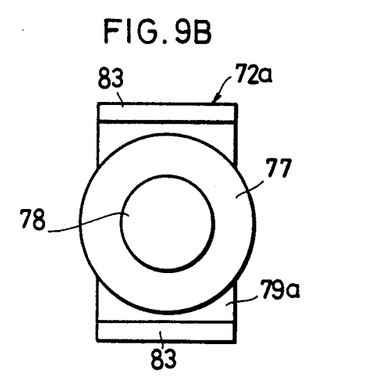
FIG. 9B is an end elevational view of a modified electromagnet assembly for combined use with the permanent magnet assembly of FIG. 9A.

FIGS. 9A and 9B are end views showing a modified combination of permanent magnet and electromagnet assemblies, also suitable for use in the rearview mirror of the type shown in FIG. 5. The modified permanent magnet assembly 71a has the permanent magnet proper 75 secured to a yoke 76a in the shape of the letter U. The modified electromagnet assembly 72a also has the electromagnet core 78 secured to a U-shaped yoke 79a. The edges 82 of the permanent magnet assembly yoke 76a and the corresponding edges 83 of the electromagnet assembly yoke 79a are movable into and out of contact with each other with the movement of the permanent magnet proper 75 and electromagnet core 78 into and out of contact with each other.

Figure 10A:
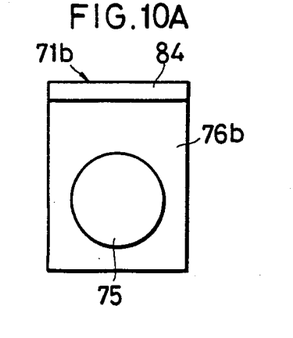
FIG. 10A is an end elevational view of another modified permanent magnet assembly for use in the mirror mechanism of the type shown in FIG. 5.
Figure 10B:
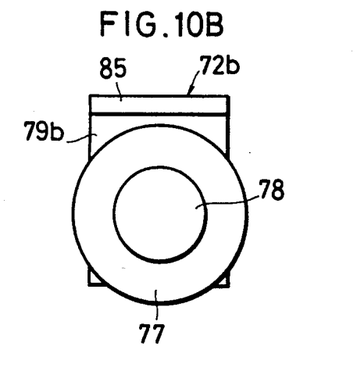
FIG. 10B is an end elevational view of another modified electromagnet assembly for combined use with the permanent magnet assembly of FIG. 10A.

Another modified combination of permanent magnet and electromagnet assemblies are shown in FIGS. 10A and 10B. The second modified permanent magnet assembly 71b has the permanent magnet proper 75 secured to a yoke 76b in the shape of the capital L. The correspondingly modified electromagnet assembly 72b has the electromagnet core 78 secured to an L-shaped yoke 79b. The opposed edges 84 and 85 of these modified yokes 76b and 79b are movable into and out of contact with each other with the movement of the permanent magnet proper 75 and electromagnet core 78 into and out of contact with each other.

It will be understood that the modified pair of yokes 76a and 79a of FIGS. 9A and 9B and the other modified pair of yokes 76b and 79b of FIGS. 10A and 10B are intended to perform the same functions as the yokes 76 and 79 of FIGS. 6 and 7, serving conjointly to increase the attractive and repulsive forces between the permanent magnet and electromagnet assemblies.

Figure 11:
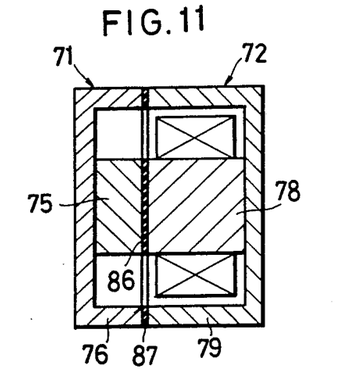
FIG. 11 is a view similar to FIG. 6 except that sheets of magnetic rubber are shown attached to either of the permanent magnet and electromagnet assemblies by way of noise reduction.

In FIG. 11 is shown a disc-like sheet of magnetic rubber 86 attached to either of the confronting surfaces of the permanent magnet proper 75 of the permanent magnet assembly 71 and the electromagnet core 78 of the electromagnet assembly 72. Another sheet of magnetic rubber 87, annular in shape, is attached to either of the open end edges of the yokes 76 and 79. These sheets of magnetic rubber 86 and 87 are effective to reduce the clicks produced as the permanent magnet assemblies move into contact with the electromagnet assemblies, without impairing the intended functions of these assemblies.

Figure 12:
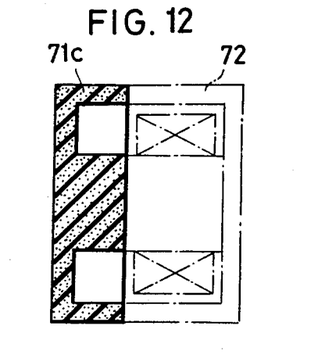
FIG. 12 is a sectional view of another modified permanent magnet assembly, shown together with a phantom electromagnet assembly which is identical with that depicted in FIGS. 6, 7 and 8B.

An alternative to the noise reduction means of FIG. 11 is represented in FIG. 12, in which a permanent magnet assembly 71c of the type shown in FIGS. 6 and 7 is integrally molded of magnetic rubber. If desired, magnetic plastic may be employed instead of magnetic rubber. The permanent magnet assembly 71c is intended for use with the usual electromagnet assembly 72 depicted in phantom.

Figure 13:
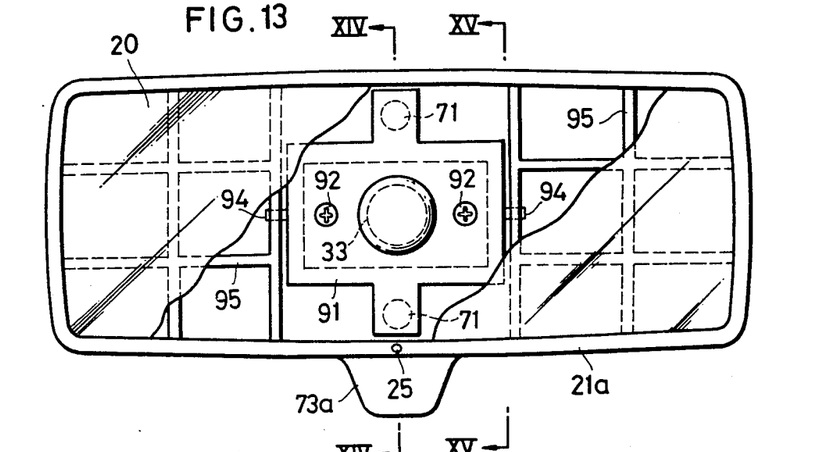
FIG. 13 is a front elevational view of a further preferred form of the antiglare mirror mechanism in accordance with the invention, in which the mirror element is shown partly broken away to clearly reveal the inner details.
Figure 14:
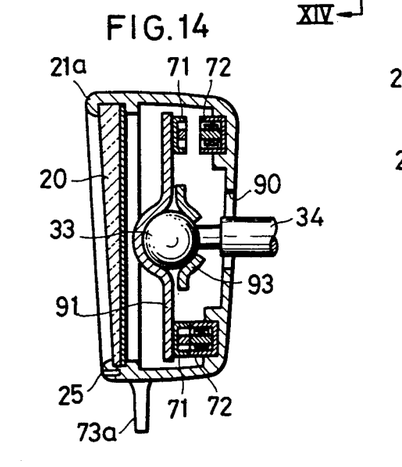
FIG. 14 is a sectional view on the line XIV—XIV of FIG. 13.
Figure 15:
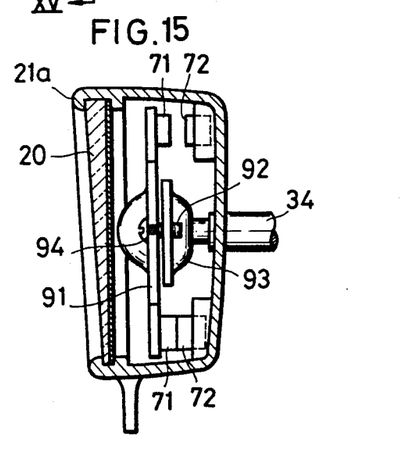
FIG. 15 is also a sectional view on the line XV—XV of FIG. 13.

FIGS. 13, 14 and 15 illustrate still another preferred embodiment which differs from all the preceding embodiments in that the mirror element 20 is immovably supported by a housing 21a. This "mirror assembly" comprising mirror element 20 and housing 21a is arranged to pivot with respect to stationary support means hereinafter set forth. The housing 21a engages the peripheral edges of the mirror element 20 at its open front end. An operating tab 73a is shown to extend downwardly from the bottom of the housing 21a. The photocell is shown to be mounted at 25 on the housing 21a.

Formed in the rear wall of the housing 21a is a clearance hole 90 through which the mounting bracket 34 extends into the housing. The mounting bracket 34 terminates in the ball 33. Within the housing 21a a support plate 91 is fastened as by a pair of screws 92 to a member 93 coacting with the support plate to define a socket snugly but slidably receiving the ball 33. The support plate 91 has a pair of trunnions 94 projecting from its opposite side ends.

The housing 21a is internally provided with a pair of networks 95 of reinforcing ribs disposed on opposite sides of the support plate 91 and engaging the trunnions 94 projecting therefrom. The housing 21a together with the mirror element 20 is pivotable on the trunnions 94, which are located intermediate between the top and bottom ends of the housing, relative to the support plate 91. Although the support plate 91 is actually movable relative to the mounting bracket 34, it can be considered stationary for the purposes of this invention.

The pair of permanent magnet assemblies 71 are affixed to the rear surface of the support plate 91 at or adjacent the top and bottom ends thereof. The corresponding pair of electromagnet assemblies 72 are carried by the housing 21a, in positions opposite to the respective permanent magnet assemblies 71. Of course, these permanent magnet 71 and electromagnet 72 assemblies may be replaced by plain permanent magnets and plain electromagnets or by any of the modified combinations of permanent magnet and electromagnet assemblies shown in FIGS. 9A and 9B, 10A and 10B, 11 and 12.

Any of the noted three operating modes may be employed for automatic actuation of the mirror assembly, comprising mirror element 20 and housing 21a, between the first and second operating positions in accordance with the intensity of the incident light sensed by the photocell 25. Manual actuation of the mirror assembly is also possible by means of the operating tab 73a.

Among the advantages of the FIGS. 13 through 15 embodiment is that since the housing 21a has the mirror element 20 fixedly mounted in its open front end, the housing is not to be easily distorted or otherwise deformed by external stresses that may be applied thereto in use. The mirror element itself is also not to be easily broken. Furthermore, since the permanent magnet 71 and electromagnet 72 assemblies are substantially completely enclosed within the housing 21a, the clicks produced thereby will hardly disturb the driver's ears.

Such noise can be further reduced or made almost inaudible by use of the permanent magnet and electromagnet assemblies of FIG. 11 or 12.

Figure 16:
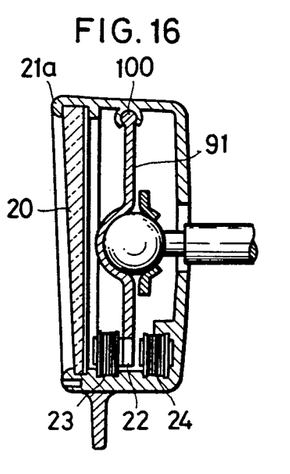
FIG. 16 is a view corresponding to FIG. 14 and showing a slightly modified mirror mechanism.

A rearview mirror shown in FIG. 16 differs from that of FIGS. 13 through 15 in that the mirror assembly comprising mirror element 20 and housing 21a is pivotally supported at its top end 100 by the support plate 91. The permanent magnet 22 is mounted on the bottom end of the support plate 91, and the pair of electromagnets 23 and 24 are secured to the housing 21a and disposed on the front and rear sides of the permanent magnet. This rearview mirror may be considered a hybrid of the FIG. 1 embodiment and that of FIGS. 13 through 15.

The rearview mirror of FIG. 16 is subject to additional modifications. For example, an electromagnet may be mounted on the support plate 91, and a pair of permanent magnets may be mounted on the housing 21a. It is also possible to pivotally connect the housing 21a to the support plate 19 at its bottom end.

Figure 17:
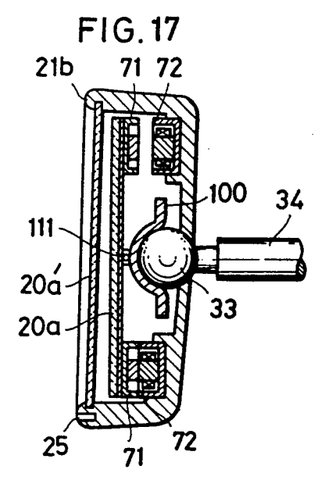
FIG. 17 is a vertical sectional view of a further preferred form of the antiglare mirror mechanism in accordance with the invention.

In FIG. 17 is shown a further preferred embodiment which includes a planar mirror element 20a coacting with a plate 20a' of glass or like transparent material to provide a reflected image of high or low brightness. The transparent plate 20a' is immovably engaged in the open front end of a housing 21b. The ball 33 on one end of the mounting bracket 34 projects into the housing 21b through its rear wall and is snugly but slidably received in a socket defined by the housing and a socket member 110. This socket member lies within the housing 21b and is fastened thereto by means not seen in FIG. 17.

Within the housing 21b the planar mirror element 20a is disposed behind the transparent plate 20a' and is pivotally mounted at 111, intermediate between its top and bottom ends, on the socket member 110. The pair of permanent magnet assemblies 71 are affixed to the rear of the planar mirror element 20a at or adjacent the top and bottom ends thereof. The corresponding pair of electromagnet assemblies 72 are secured to the housing 21b in opposed relationship to the respective permanent magnet assemblies 71. The photocell is mounted at 25 on the housing 21b.

Automatic actuation of the planar mirror element 20a may be effected by any of the three possible operating modes. A reflected image of high brightness is provided by the planar mirror element 20a when the same is in the first operating position. Upon pivotal motion of this planar mirror element to the second operating position, a reflected image of low brightness is provided by the transparent plate 20a'. The other details of construction and operation, as well as various possible minor modifications, of this embodiment will be apparent from the foregoing description.

Figure 18:
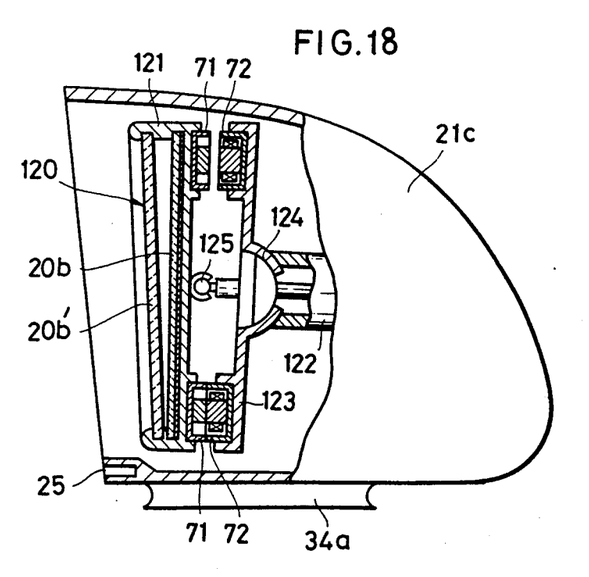
FIG. 18 is a vertical sectional view of a still further preferred form of the antiglare mirror mechanism in accordance with the invention.

FIG. 18 illustrates the invention as adapted for an outside rearview mirror. In principle this adaptation is equivalent to the FIG. 5 embodiment except that the prismatic mirror element 20 is replaced by a mirror system 120 comprising a planar mirror element 20b and a plate 20b' of glass or like transparent material. The mirror element 20b is disposed behind the transparent plate 20b', at an angle thereto, and both are fixedly supported by a mirror holder 121. The mirror element 20b and transparent plate 20b' constitute in combination the prismatic mirror system 120 capable of providing reflected images of high and low brightness.

The outside rearview mirror further comprises a stationary housing 21c having a mounting bracket 34a and supporting the photocell as at 25. The housing 21c has a supporting bracket 122 fixedly mounted therein, and a support plate 123 is coupled to the supporting bracket 122 via a universal joint 124. The mirror holder 121 holding the prismatic mirror system 120 is pivotally mounted at 125, intermediate between its top and bottom ends, on the support plate 123. The pair of permanent magnet assemblies 71 are mounted on the mirror holder 121 at or adjacent the top and bottom ends thereof. The corresponding pair of electromagnet assemblies 72 are mounted on the support plate 123 in opposed relationship to the respective permanent magnet assemblies 71.

In operation the mirror system 120 is to be pivoted automatically, in accordance with any of the three operating modes, between the first and second operating positions to provide the high and low brightness images. This adaptation also permits various minor modifications which are apparent from the foregoing.

Figure 19:
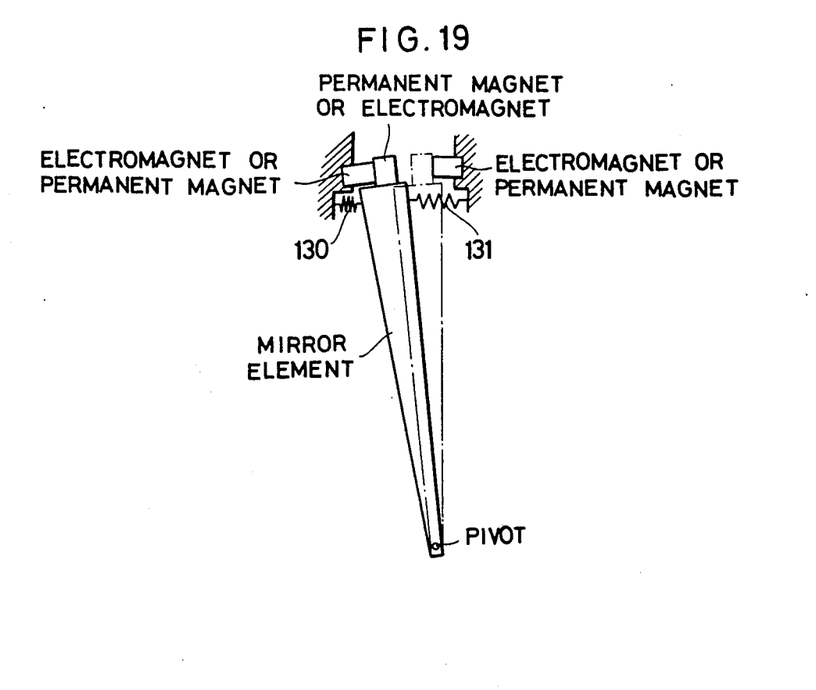
FIG. 19 is a schematic representation of the antiglare mirror mechanism of the type shown in FIG. 1 or 3, the mirror mechanism incorporating a pair of counteracting springs adapted to aid in moving the mirror element between the solid line and phantom positions.
Figure 20:
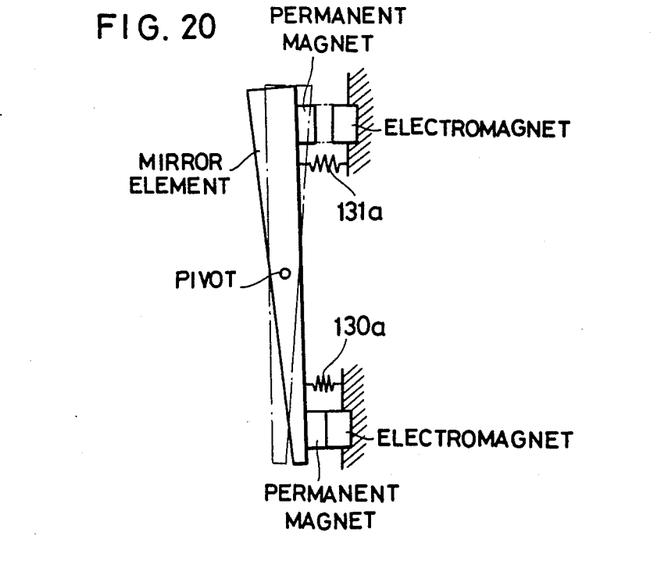
FIG. 20 is a schematic representation of the antiglare mirror mechanism of the type shown in FIG. 5, the mirror mechanism also incorporating a pair of counteracting springs adapted to aid in moving the mirror element between the solid line and phantom positions.

FIGS. 19 and 20 are explanatory of another aspect of this invention, in which the resultant of the forces of a pair of counteracting springs is utilized to aid in moving the mirror element or assembly between the first and second operating positions by magnetic attraction and/or repulsion. In the mirror mechanism of FIG. 19, for example, which is of the type shown in FIG. 1 or 3, a first tension spring 130 extends between mirror element and housing to bias the former toward the first operating position. A second tension spring 131 likewise extends between mirror element and housing to bias the former toward the second operating position.

The force of the first spring 130 is less than that of the second spring 131 when the mirror element is in the first operating position, as represented by the solid lines in FIG. 19. The force of the first spring 130 is greater than that of the second spring 131 when the mirror element is in the second operating position. The forces of the first 130 and second 131 springs counterbalance each other when the mirror element lies midway between the first and second operating positions.

Thus, when lying in either of the first and second operating positions, the mirror element is biased toward the other operating position by the resultant of the forces of the two counteracting springs 130 and 131. This resultant of the spring forces is effectively utilized to aid in moving the mirror element from one operating position to the other, so that the electromagnet or electromagnets can be reduced in size. It is necessary, however, that the maximum resultant of the spring forces be less than the attractive force of the permanent magnet or of each permanent magnet.

The same principle is applicable to the mirror mechanism of FIG. 20, which is of the type shown in FIG. 5. This mirror mechanism is also shown to comprise a first tension spring 130a biasing the mirror element toward the first operating position, and a second tension spring 131a biasing the mirror element toward the second operating position. The other details are as set forth above in connection with FIG. 19. As will be understood, the tension springs 130, 131, 130a and 131a in FIGS. 19 and 20 can be replaced by compression springs. It will also be seen that the principle of FIGS. 19 and 20 is applicable to all the embodiments disclosed herein.

It is believed that the various objects of this invention are fully accomplished by the several embodiments herein chosen to illustrate the invention. Additional embodiments and adaptations will readily occur to those skilled in the art, however, without departing from the spirit or scope of the invention as set forth in the following claims.

What is claimed is:

1. A mirror mechanism for selectively producing an image of high or low brightness depending upon the intensity of incident light, comprising:
   (a) support means;
   (b) a mirror assembly supported by the support means for pivotal motion between two predetermined operating positions to provide the high and low brightness images;
   (c) permanent magnet means secured to either of the support means and the mirror assembly;
   (d) electromagnet means secured to the other of the support means and the mirror assembly in opposed relationship to the permanent magnet means;
   (e) the electromagnet means including core means normally coacting with the permanent magnet means to hold the mirror assembly in a selected one of the operating positions;
   (f) sheets of magnetic rubber attached to at least one of said permanent magnet means and said electromagnet means to effect noise reduction;
   (g) a light sensitive element arranged to sense the intensity of light impinging on the mirror assembly; and
   (h) electric circuit means responsive to the sensing by said light sensitive element of a change in the intensity of the incident light, for energizing the electromagnet means for a preset length of time for causing the pivotal motion of the mirror assembly from one to the other of the operating positions by virtue of magnetic attraction and/or repulsion between the permanent magnet means and the electromagnet means;
   (i) whereby the energization of the electromagnet means is required only for moving the mirror assembly between the operating positions.

2. A mirror mechanism as recited in claim 1, wherein the mirror assembly is pivotally supported at one of its opposite ends, wherein the permanent magnet means comprises a permanent magnet secured to the other of the opposite ends of the mirror assembly, and wherein the electromagnet means comprises a pair of electromagnets secured to the support means and disposed on opposite sides of the permanent magnet.

3. A mirror mechanism as recited in claim 1, wherein the mirror assembly is pivotally supported at one of its opposite ends, wherein the electromagnet means comprises an electromagnet secured to the other of the opposite ends of the mirror assembly, and wherein the permanent magnet means comprises a pair of permanent magnets secured to the support means and disposed on opposite sides of the electromagnet.

4. A mirror mechanism as recited in claim 1, wherein the mirror assembly is pivotally supported intermediate between its opposite ends, wherein the permanent magnet means comprises a pair of permanent magnets, and wherein the electromagnet means comprises a pair of electromagnets disposed opposite to the respective permanent magnets, either of the pair of permanent magnets and the pair of electromagnets being secured to the mirror assembly adjacent said opposite ends thereof.

5. A mirror mechanism as recited in claim 1, wherein the permanent magnet means comprises a pair of permanent magnet assemblies each including a permanent magnet and a yoke of comparatively high magnetic permeability connected substantially integrally thereto, and wherein the electromagnet means comprises a pair of electromagnet assemblies disposed opposite to the respective permanent magnet assemblies and each including an electromagnet and a yoke of comparatively high magnetic permeability connected substantially integrally to the core of the electromagnet, the yokes of each permanent magnet assembly and the corresponding one of the electromagnet assemblies being movable into and out of contact with each other and serving conjointly to increase the attractive and repulsive forces between the permanent magnet and electromagnet assemblies.

6. A mirror mechanism as recited in claim 5, wherein the yokes of the permanent magnet assemblies and the electromagnet assemblies are each in the shape of a hollow cylinder closed at one end.

7. A mirror mechanism as recited in claim 5, wherein the yokes of the permanent magnet assemblies and the electromagnet assemblies are each in the shape of the letter U.

8. A mirror mechanism as recited in claim 5, wherein the yokes of the permanent magnet assemblies and the electromagnet assemblies are each in the shape of the letter L.

9. A mirror mechanism as recited in claim 1, wherein the mirror assembly includes an operating tab whereby the mirror assembly can be manually moved between the operating positions.

10. A mirror mechanism as recited in claims 1, 2, 3 or 4, further comprising:
   (a) a first spring biasing the mirror assembly toward one of the operating positions; and
   (b) a second spring biasing the mirror assembly toward the other operating position, the force of the second spring being greater than the force of the first spring when the mirror assembly is in said one operating position, being less than the force of the first spring when the mirror assembly is in said other operating position, and being equal to the force of the first spring when the mirror assembly lies midway between the two operating positions;
   (c) whereby the movement of the mirror assembly in either direction between the operating positions is aided by the resultant of the forces of the first and the second springs.

11. A mirror mechanism for selectively providing an image of high or low brightness depending upon the intensity of incident light, comprising:
   (a) support means;
   (b) a mirror assembly supported by the support means for pivotal motion between two predetermined operating positions to provide the high and low brightness images;
   (c) permanent magnet means secured to either of the support means and the mirror assembly, said permanent magnet means comprising a pair of permanent magnet assemblies each including a yoke of comparatively high magnetic permeability and a permanent magnet molded integrally with said yoke from a material selected from the group consisting of magnetic rubber and magnetic plastic;
   (d) electromagnet means secured to the other of the support means and the mirror assembly in opposed relationship to the permanent magnet means;
   (e) said electromagnet means comprising a pair of electromagnetic assemblies disposed opposite to the respective permanent magnet assemblies and coacting with said permanent magnet assemblies normally to hold the mirror assembly in a selected one of the operating positions, each of electromagnetic assemblies comprising a core, an electromagnet around said core and a yoke of comparatively high magnetic permeability connected substantially integrally to said core, the yoke of each permanent magnet assembly and the yoke of said corresponding electromagnetic assembly being relatively movable into and out of contact with each other and serving conjointly to increase the attractive and repulsive forces between said permanent magnet and electromagnet assemblies;

(f) a light sensitive element arranged to sense the intensity of light impinging on the mirror assembly; and (g) electric circuit means responsive to the sensing by said light sensitive element of a change in the intensity of the incident light, for energizing the electromagnet means for a preset length of time for causing the pivotal motion of the mirror assembly from one to the other of the operating positions by virtue of magnetic attraction and/or repulsion between the permanent magnet means and the electromagnet means;

(h) whereby the energization of the electromagnet means is required only for moving the mirror assembly between the operating positions.

* * * * *